United States Patent
Gildea et al.

(10) Patent No.: US 11,592,110 B2
(45) Date of Patent: Feb. 28, 2023

(54) CASSETTE SEAL FOR USE IN EXTREME ENVIRONMENTS

(71) Applicant: AKTIEBOLAGET SKF, Gothenburg (SE)

(72) Inventors: Gregory G. Gildea, Village of Lakewood, IL (US); Marco Erminio Panchetti, Turin (IT); Alex Paykin, Buffalo Grove, IL (US); Thomas Schwarz, Leoben (AT); Hans-Joachim vom Stein, Odenthal (DE)

(73) Assignee: AKTIEBOLAGET SKF, Gothenburg (SE)

( * ) Notice: Subject to any disclaimer, the term of this patent is extended or adjusted under 35 U.S.C. 154(b) by 37 days.

(21) Appl. No.: 17/460,848

(22) Filed: Aug. 30, 2021

(65) Prior Publication Data

US 2022/0074498 A1 Mar. 10, 2022

(30) Foreign Application Priority Data

Sep. 8, 2020 (IT) .................. 102020000021259

(51) Int. Cl.
  *F16J 15/32* (2016.01)
  *F16J 15/3256* (2016.01)
(52) U.S. Cl.
  CPC .................. *F16J 15/3256* (2013.01)
(58) Field of Classification Search
  CPC .................................................. F16J 15/3256
  See application file for complete search history.

(56) References Cited

U.S. PATENT DOCUMENTS

| 2,307,152 A | 1/1943 | Murray |
| 2,498,739 A * | 2/1950 | Magnesen ............... F16C 33/78 |
| | | 277/374 |

(Continued)

FOREIGN PATENT DOCUMENTS

| CN | 206753916 U | 12/2017 |
| EP | 3351319 A1 | 7/2018 |
| GB | 2050533 A | 1/1981 |

OTHER PUBLICATIONS

Search Report and Written Opinion from the Italian Patent Office dated Jun. 15, 2021 in related Italian application No. 102020000021259, and translation thereof.

*Primary Examiner* — Vishal A Patel
(74) *Attorney, Agent, or Firm* — J-Tek Law PLLC; Scott T. Wakeman; Mark A. Ussai

(57) ABSTRACT

A seal assembly includes an outer annular case disposed within and coupled with a rotatable outer member to be angularly displace about a central axis. An annular flexible seal is disposed within and coupled with the case to angularly displace about the central axis when the outer member rotates about the axis. The flexible seal has elastomeric sealing lip(s) engageable with an outer circumferential surface of the shaft or of a sleeve disposed about the shaft. An annular inner rigid seal is disposed within the outer case and has an inner end coupled with the shaft or the sleeve, the flexible seal being radially displaceable with respect to the inner rigid seal. An outer annular rigid seal is disposed about the inner seal and has an inner end sealing against the inner rigid seal. A biasing member biases the outer rigid seal against the inner rigid seal.

20 Claims, 11 Drawing Sheets

(56) References Cited

U.S. PATENT DOCUMENTS

| | | | | |
|---|---|---|---|---|
| 3,129,949 A | * | 4/1964 | Laux | F16J 15/38 |
| | | | | 277/394 |
| 4,277,072 A | * | 7/1981 | Forch | F16J 15/164 |
| | | | | 277/377 |
| 5,040,804 A | | 8/1991 | Back | |
| 5,332,361 A | * | 7/1994 | Bras | F04D 29/126 |
| | | | | 277/916 |
| 5,492,337 A | * | 2/1996 | Lederman | F16C 33/7879 |
| | | | | 277/307 |
| 2009/0096175 A1 | * | 4/2009 | Schwerdtfeger | F16J 15/348 |
| | | | | 277/572 |

* cited by examiner

CASSETTE SEAL FOR USE IN EXTREME ENVIRONMENTS

CROSS-REFERENCE

This application claims priority to Italian Patent Application No. 102020000021259, filed Sep. 8, 2020, the entire contents of which are fully incorporated herein by reference.

BACKGROUND OF THE INVENTION

The present invention relates to seal assemblies, and more particularly to radial lip seal assemblies for use in harsh or extreme environments.

Radial lip seal assemblies are known and typically include at least one elastomeric member with one or more sealing lips inwardly engageable with a shaft or outwardly engageable with a housing, hub or other member mounted about a shaft. When used in relatively harsh or extreme environments, such as in roll lines of metal casting machines, the seals may be required to prevent potentially damaging substances, such as steam, metal scale, etc., from contacting other mechanical components, for example bearings. In such applications, these radial lip seals may be used in combination with rigid seal components, such as a thermoplastic scrapers, to provide an initial guard or barrier against such damaging substances.

SUMMARY OF THE INVENTION

In one aspect, the present invention is a seal assembly for sealing between a central shaft and outer member disposed about the shaft, the outer member being rotatable about an axis extending through the shaft. The seal assembly comprises an outer annular case disposed within and coupled with the outer member so as to be angularly displaceable about the central axis. An annular flexible seal is disposed within and coupled with the case so as to angularly displace about the central axis when the outer member rotates about the axis. The flexible seal has at least one elastomeric sealing lip engageable with an outer circumferential surface of the shaft or of a sleeve disposed about the shaft. An inner annular rigid seal is disposed at least partially within the outer case and has an inner radial end, the inner radial end being spaced axially from the sealing lip and coupled with the shaft or with the sleeve disposed about the shaft. An outer radial end of the rigid seal is slidably disposed against the flexible seal such that the flexible seal is radially displaceable relative to the rigid seal when the outer member displaces radially with respect to the shaft. Further, an outer annular rigid seal is disposed about the inner rigid seal, coupled with the case so as to be angularly displaceable about the central axis and has an inner end sealingly engageable with the inner rigid seal. A biasing member is configured to bias the outer rigid seal toward the inner rigid seal such that the outer rigid seal sealingly engages with the inner rigid seal.

In a further aspect, the present invention is again a seal assembly as described in the preceding paragraph and in which the case has a cylindrical portion with first and second axial ends, a first radial flange extending inwardly from the first axial end of the cylindrical portion and a second radial flange extending inwardly from the second axial end of the cylindrical portion. Also, the flexible seal is a first flexible seal and the seal assembly further comprises a second annular flexible seal disposed within and coupled with the case so as to angularly displace about the central axis when the outer member rotates about the axis. The second flexible seal is spaced axially from the first flexible seal and has at least one elastomeric sealing lip engageable with an outer circumferential surface of the shaft or of a sleeve disposed about the shaft. Further, the biasing member is either disposed axially between the first radial flange of the outer case and the outer rigid seal or disposed about a cylindrical portion of the outer rigid seal.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
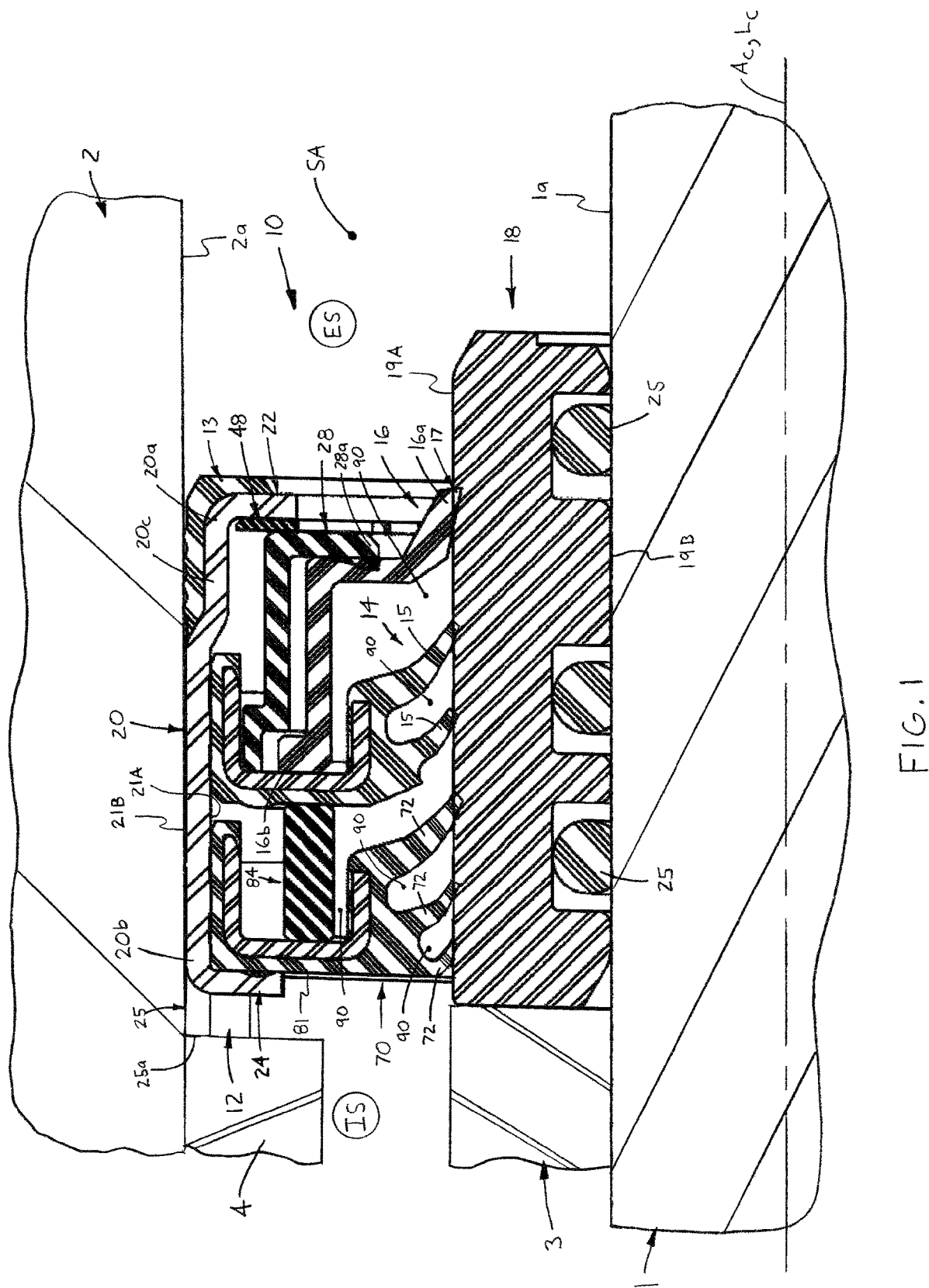
FIG. 1 is a broken-away, axial cross-sectional view of a seal assembly in accordance with the present invention, shown with a preferred sleeve and sealing between a central shaft and an outer member.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-16 a seal assembly 10 for sealing an annular space between a central shaft 1 and outer member 2 disposed about the shaft 1. The seal assembly 10 functions to prevent fluids, such as heated water, steam, etc., and/or solids (e.g., metal scale particles) from passing from an exterior side ES of the seal assembly 10 to an interior side IS in order to protect interior component(s) 3, for example a bearing 4 (FIG. 1) coupling the outer member 2 with the shaft 1. In one preferred application, the outer member 2 is a roll of a metal casting roll line (not shown) and is rotatable about a central axis $A_C$ extending through the shaft 1, but may be any other appropriate component rotatably mounted about a shaft 1. The seal assembly 10 basically comprises an outer case 12, at least one annular flexible seal 14 coupled with the case 12, an inner annular "scraper" or rigid seal 16 coupled with the shaft 1 or with a sleeve 18 disposed about the shaft 1, an outer rigid seal/scraper 28 disposed about the inner rigid seal 16 and a biasing member 48 configured to bias the outer rigid seal 28 against the inner rigid seal 16, and preferably also includes the sleeve 18.

Figure 16:
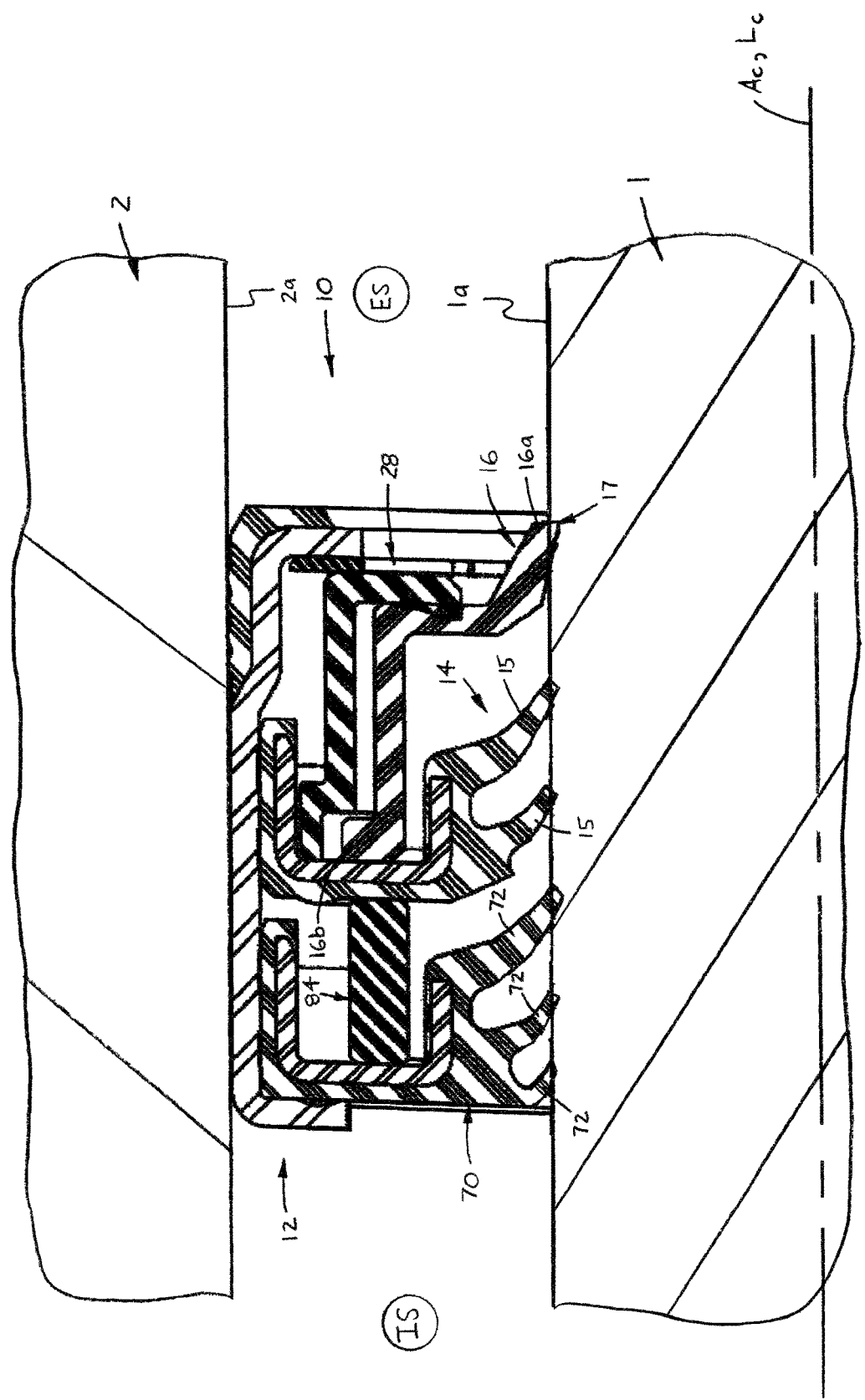
FIG. 16 is another axial cross-sectional view of the seal assembly, shown without a sleeve and sealing directly against a shaft.

More particularly, the outer case 12 is disposed within and coupled with the outer member 2 so as to be angularly displaceable about the central axis $A_C$. The flexible seal 14 is disposed within and coupled with the case 12 so as to angularly displace about the central axis $A_C$ when the outer member 2 rotates about the axis $A_C$. The flexible seal 14 has at least one elastomeric sealing lip 15 engageable with an outer circumferential surface $1a$ of the shaft 1, as shown in FIG. 16, or preferably with an outer circumferential surface 19A of the sleeve 18 disposed about the shaft 1. Further, the inner rigid seal 16 is disposed at least partially within the outer case 12 and has an inner radial end $16a$ and an outer radial end $16b$.

Specifically, the inner radial end $16a$ of the inner rigid seal 16 is spaced axially from the sealing lip 15 and is coupled with the shaft 1 (FIG. 16), or preferably with the sleeve 18, to fixedly couple or connect the seal 16 with the shaft 1. The seal outer radial end $16b$ is slidably disposed against the flexible seal 14 such that the flexible seal 14 is radially displaceable relative to the rigid seal 16 when the outer member 2 displaces radially with respect to the shaft 1, as well as sliding against the rigid seal 16 during angular displacement of the seal 14 about the axis $A_C$. Such radial displacement of the flexible seal 14 relative to the rigid seal 16 typically occurs when the outer member 2 is mounted eccentrically about the shaft 1, i.e., when the outer member axis $A_C$ is offset from the shaft centerline $L_C$ (structure not indicated).

Further, the outer rigid seal 28 is coupled with the case 12 so as to be angularly displaceable about the central axis $A_C$ and has an inner end $28a$ sealingly engageable with the inner rigid seal 16, preferably by means of a sealing lip 40 as described below. When the outer member rotates 2 rotates about the central axis $A_C$, the inner end $28/lip$ 40 of the outer rigid seal 28 slides against the inner rigid seal 16 while maintaining sealing engagement. Also, the outer rigid seal 28 is spaced radially-outwardly from the inner rigid seal 16 so as to define a clearance space $S_C$, as described below, to permit radial displacement of the outer rigid seal 28 relative to the inner rigid seal 16 during eccentric rotation of the outer member 2 about the central axis $A_C$. Furthermore, the biasing member 48 is either disposed axially between a first radial flange 22 of the outer case 12 and the outer rigid seal 26 or is disposed about a cylindrical portion 34 of the outer rigid seal 28, as described in detail below. The biasing member 48 functions to maintain sealing engagement between the outer rigid member inner end $28a$, preferably the lip 40, and the inner rigid seal 16, particularly during angular displacement of the outer member 2 about the central axis $A_C$.

Figure 2:
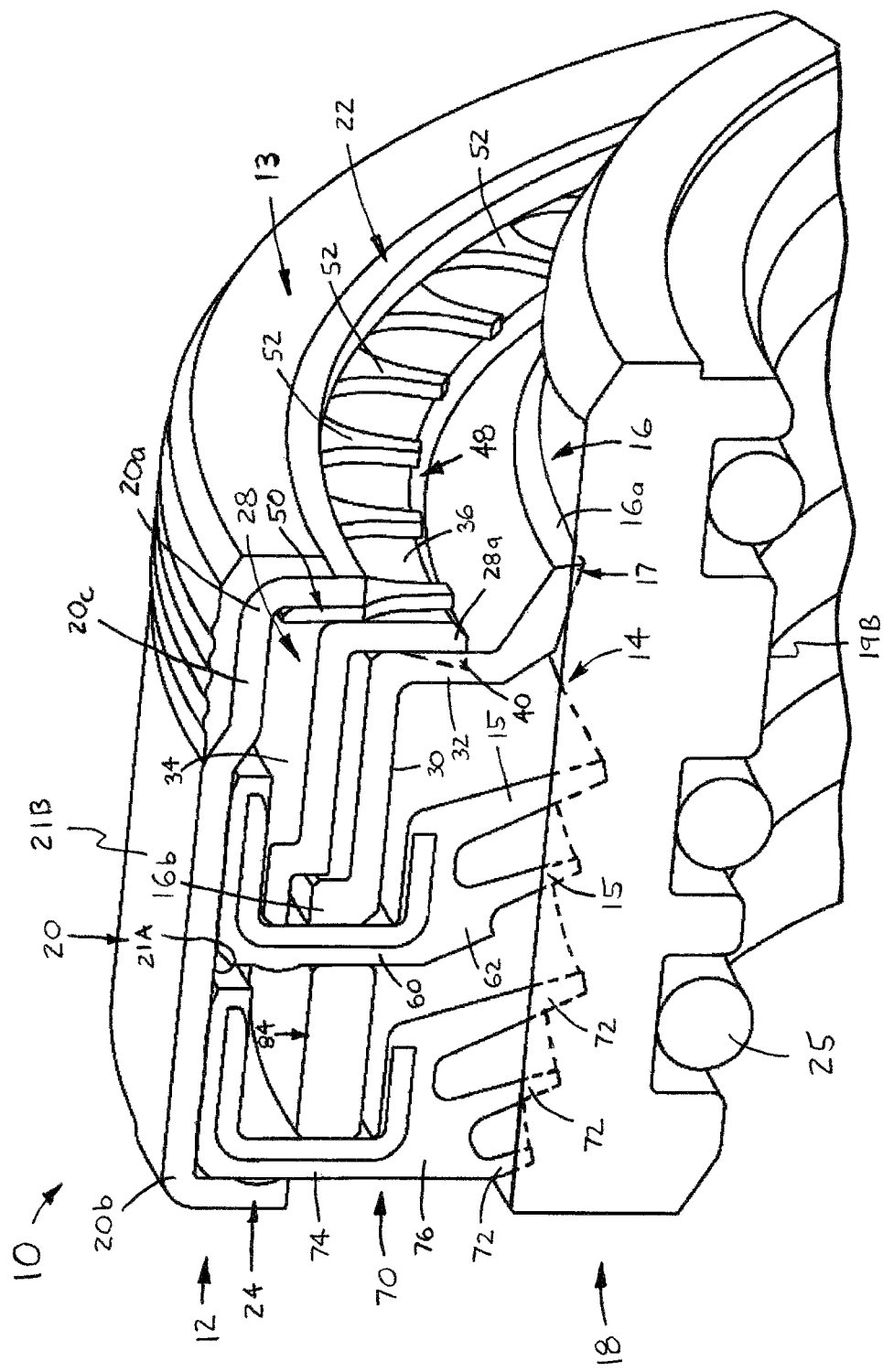
FIG. 2 is a broken-away, perspective view in partial cross-section of the seal assembly of FIG. 1.
Figure 6:
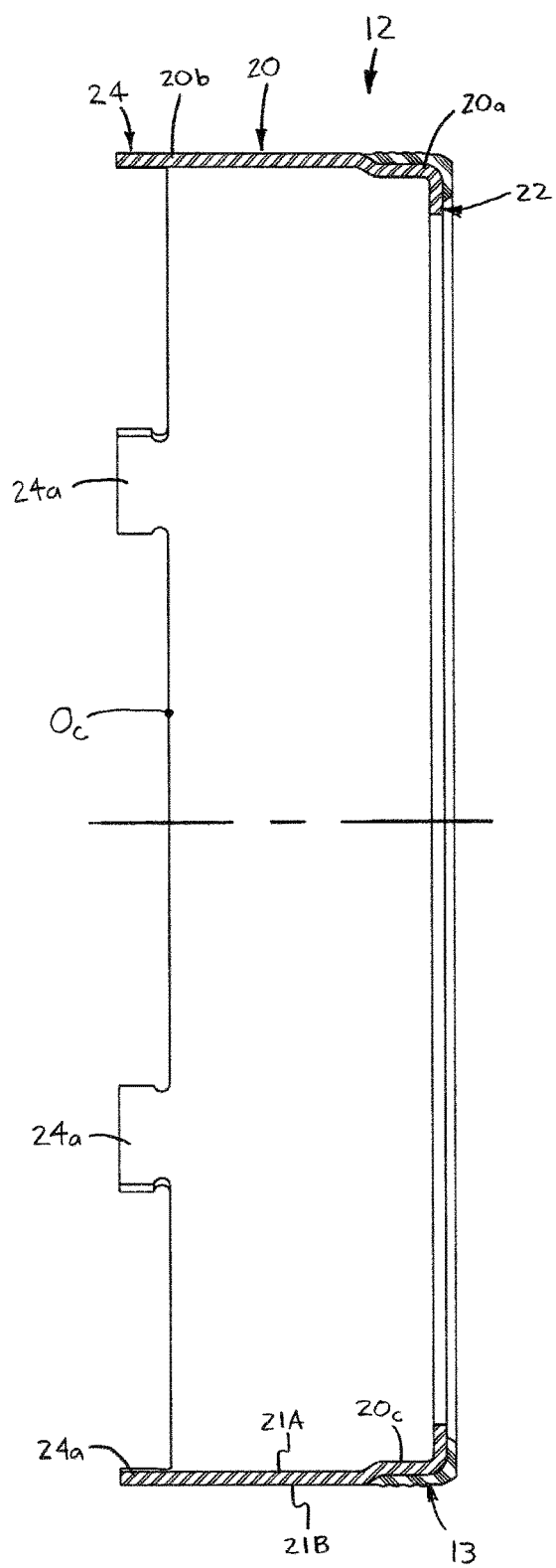
FIG. 6 is an axial cross-sectional view of an outer case of the seal assembly.

Referring to FIGS. 1, 2 and 6, the outer case 12 preferably includes a cylindrical portion 20, the cylindrical portion having inner and outer circumferential surfaces 21A, 21B and opposing first and second axial ends $20a$, $20b$, and first and second radial flanges 22, 24, respectively. Each radial flange 22, 24 extends inwardly from a separate axial end $20a$, $20b$, respectively, of the cylindrical portion 20. The outer circumferential surface 21B is frictionally engaged with the inner circumferential surface $2a$ of the outer member 2 to couple the seal assembly 10 with the outer member 2. The first flange 22 is preferably a single continuous portion of the case 12, whereas the second flange 24 is preferably formed of several flange portions $24a$, e.g., six portions $24a$, which are initially formed flat and extending axially from the second end $20b$ of the cylindrical portion 20, as depicted in FIG. 6. With such a second flange structure, the various components of the seal assembly 10 may be installed within the case 12 through an opening $O_C$ (FIG. 6) defined at the second end $20b$ of the case cylindrical portion 20, and then bended inwardly to retain the components within the case 12, as discussed below.

Figure 4:
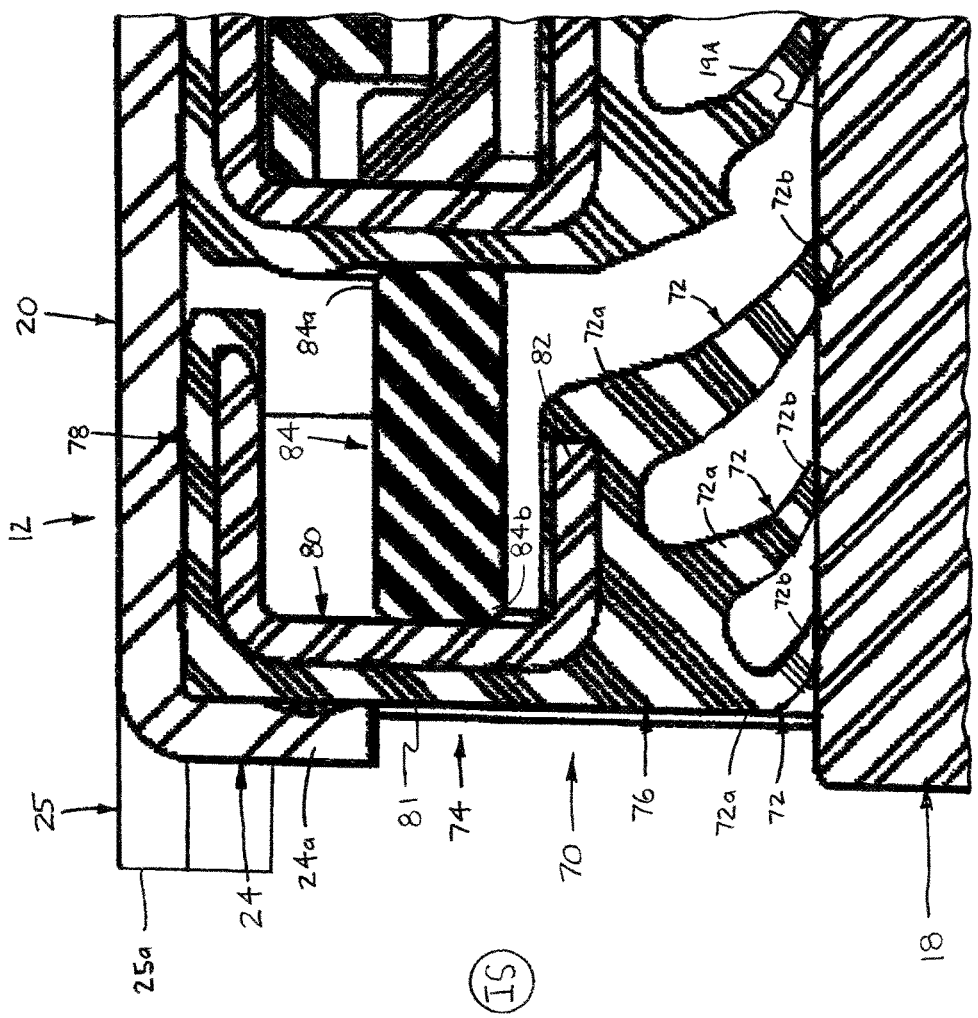
FIG. 4 is an enlarged, broken-away view of another portion of FIG. 1.

As depicted in FIGS. 1 and 4, the outer case 12 preferably includes at least one and most preferably a plurality of integral spacer portions 25 each extending axially from the second axial end $20b$ of the case cylindrical portion 20 and having an outer end $25a$ contactable with a component 3, such as the bearing 4, spaced axially from the seal assembly 10. The spacer portion(s) 25 function to transfer axial loading between the component 3 and the outer case 12 of the seal assembly 10, particularly due to thermal expansion of the component 3. Preferably, the spacer portion(s) 25 are generally arcuate and are formed at least generally similar to the flange portions $24a$, i.e., without being inwardly bended, but may be sized or shaped differently than the flange portions $24a$. Furthermore, the outer case 12 preferably includes a molded annular elastomeric portion 13 disposed on an inwardly-offset portion $20c$ of the case cylindrical portion 20 adjacent to the cylindrical portion first end $20a$, which functions to seal between the case 12 and the outer member 2.

Figure 7:
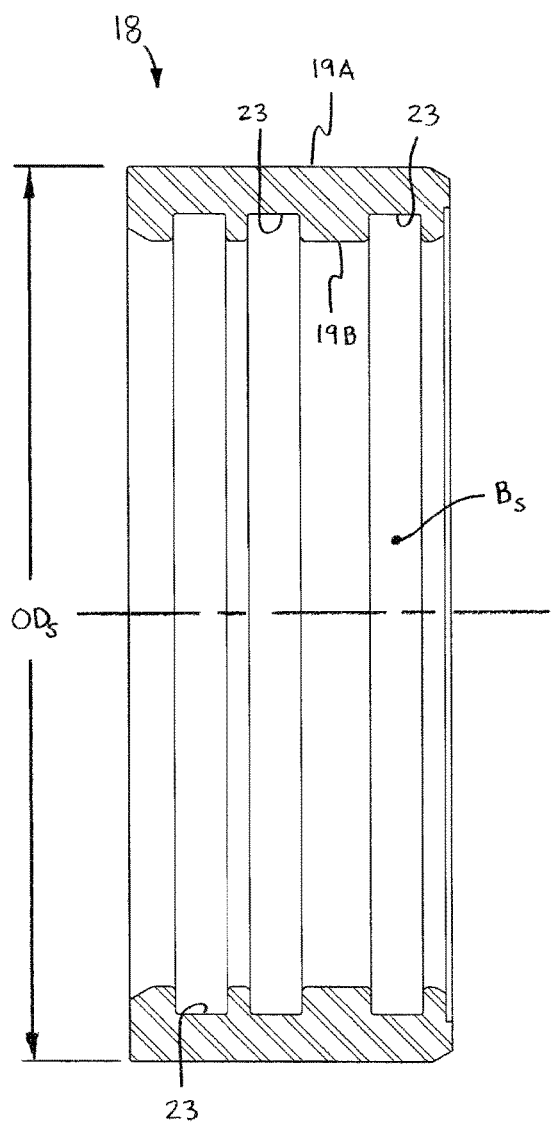
FIG. 7 is an axial cross-sectional view of the sleeve of the seal assembly.
Figure 8:
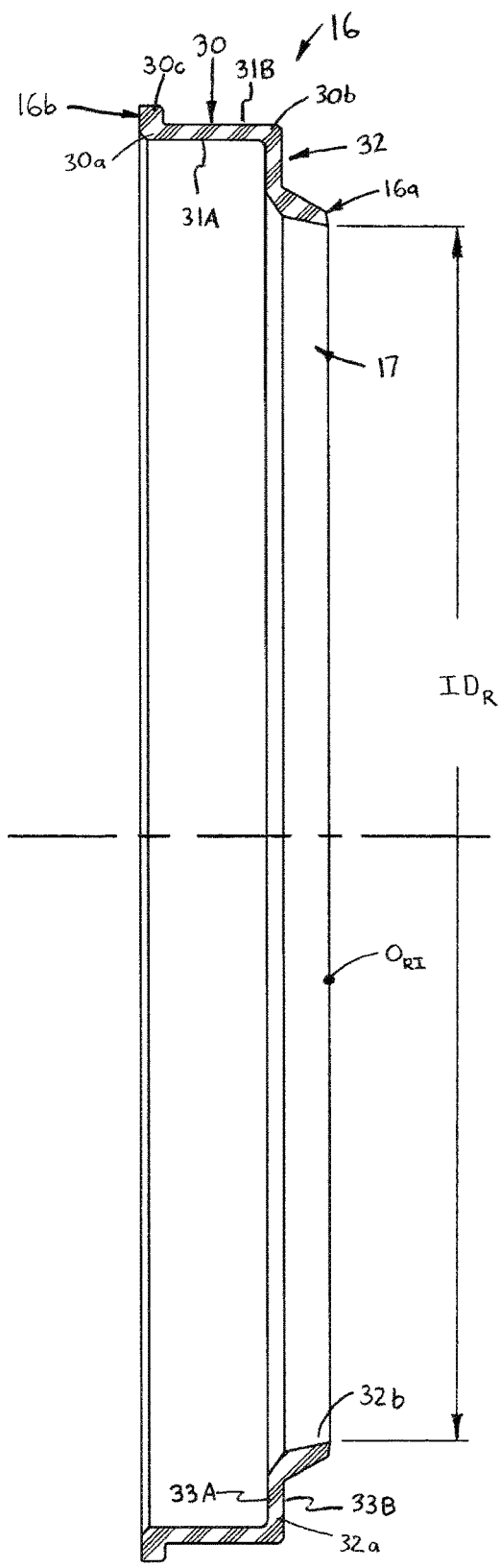
FIG. 8 is an axial cross-sectional view of an inner rigid seal.
Figure 9:
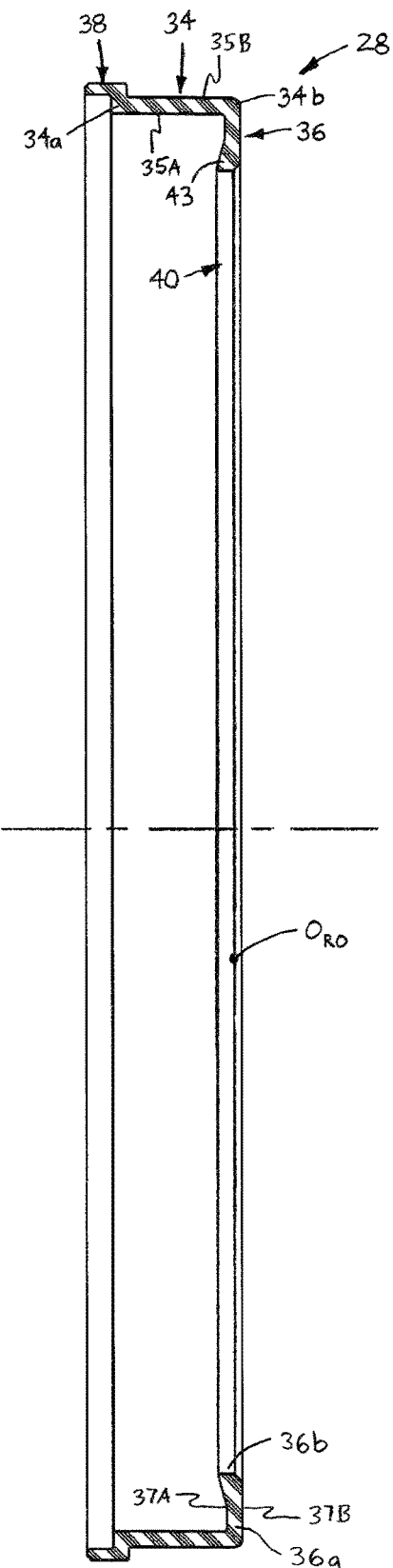
FIG. 9 is an axial cross-sectional view of the outer rigid seal.
Figure 10:
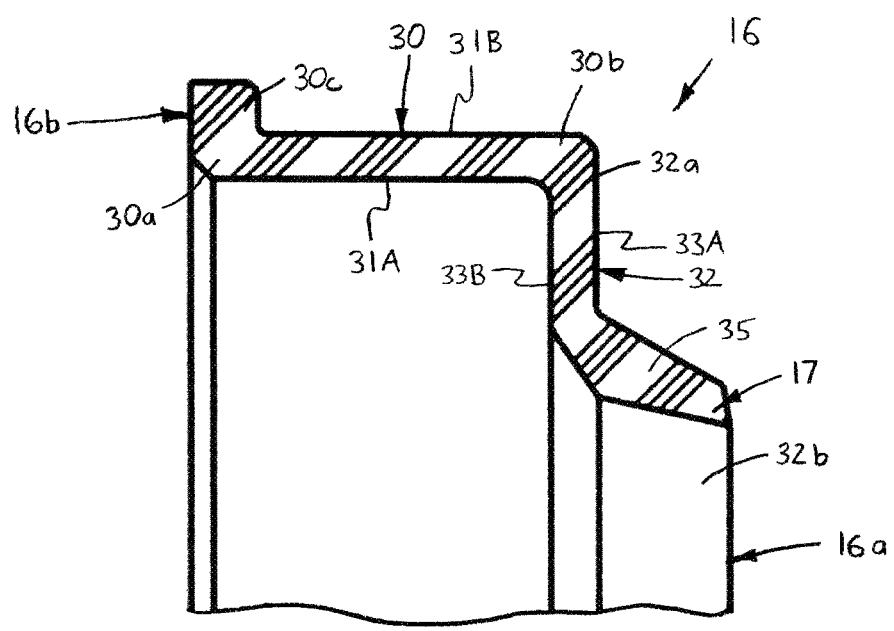
FIG. 10 is an enlarged, broken-away view of an upper portion of FIG. 8.
Figure 11:
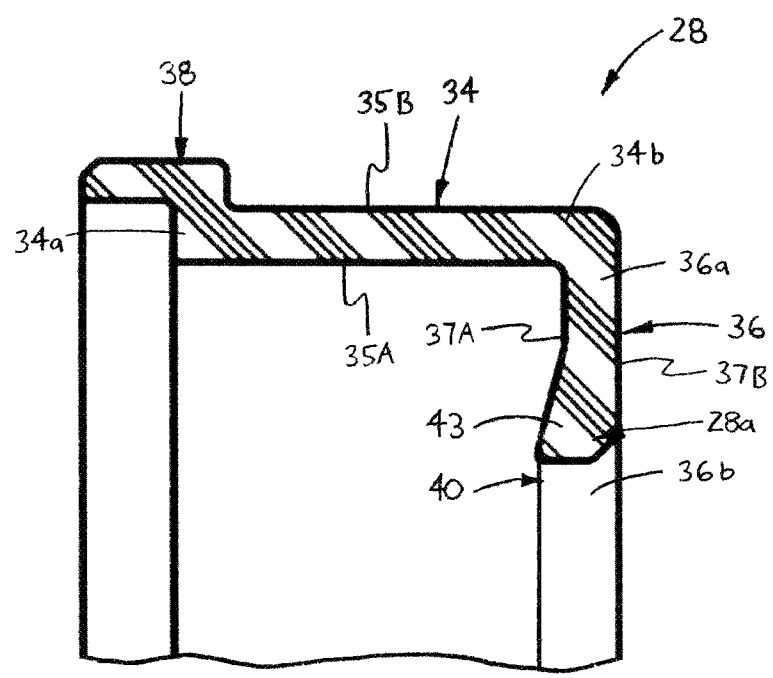
FIG. 11 is an enlarged, broken-away view of an upper portion of FIG. 9.
Figure 13:
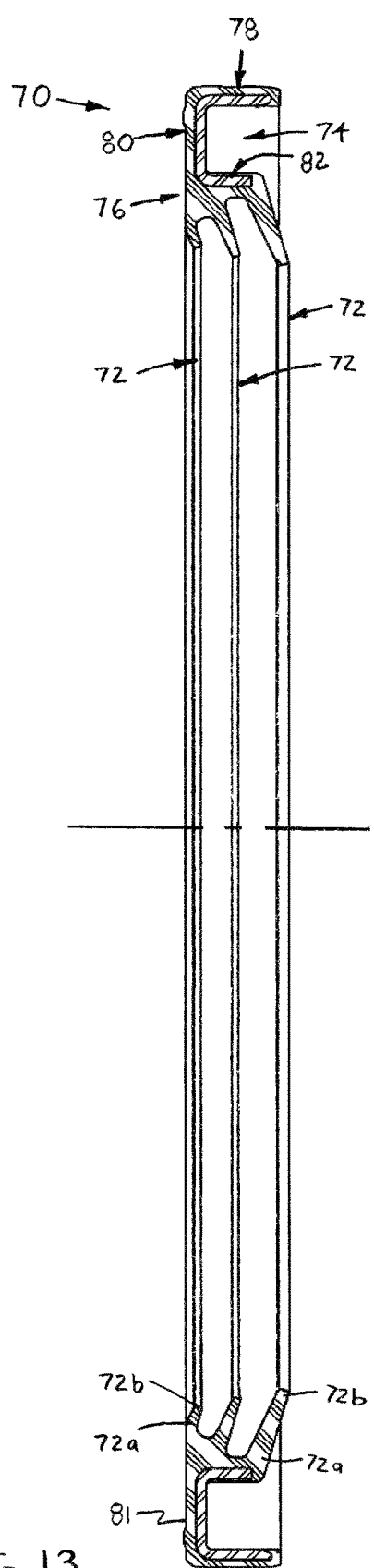
FIG. 13 is an axial cross-sectional view of a second flexible seal.
Figure 12:
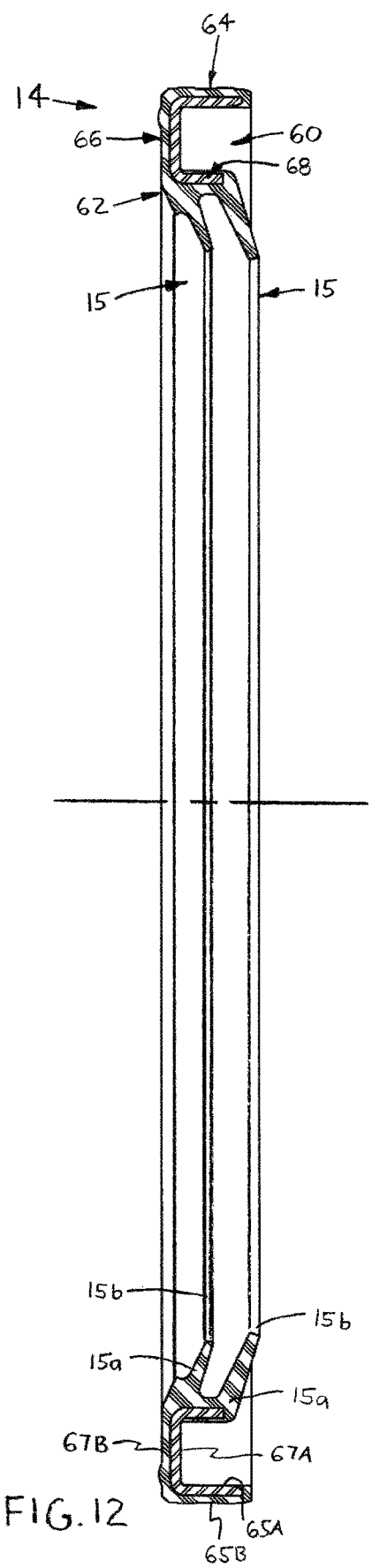
FIG. 12 is an axial cross-sectional view of a first flexible seal.
Figure 14:
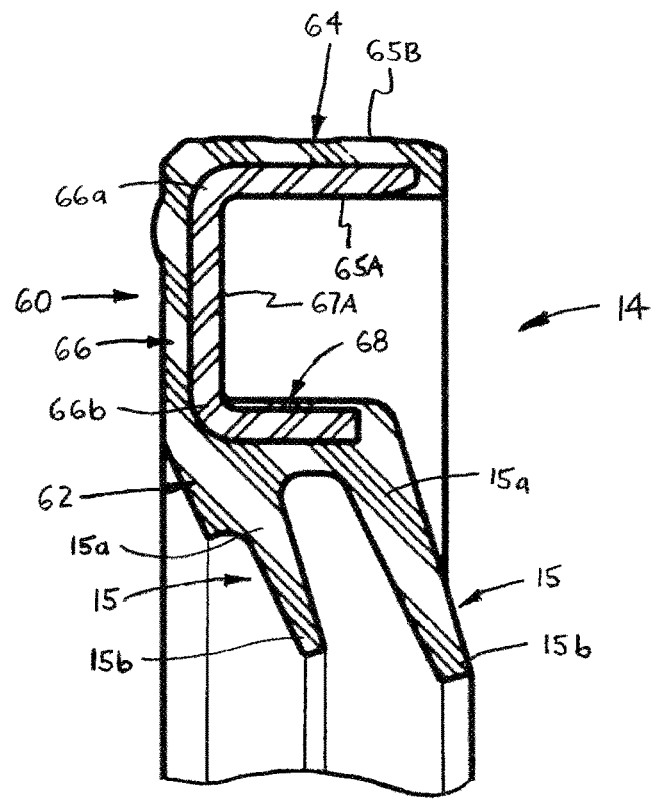
FIG. 14 is an enlarged, broken-away view of an upper portion of FIG. 12.
Figure 15:
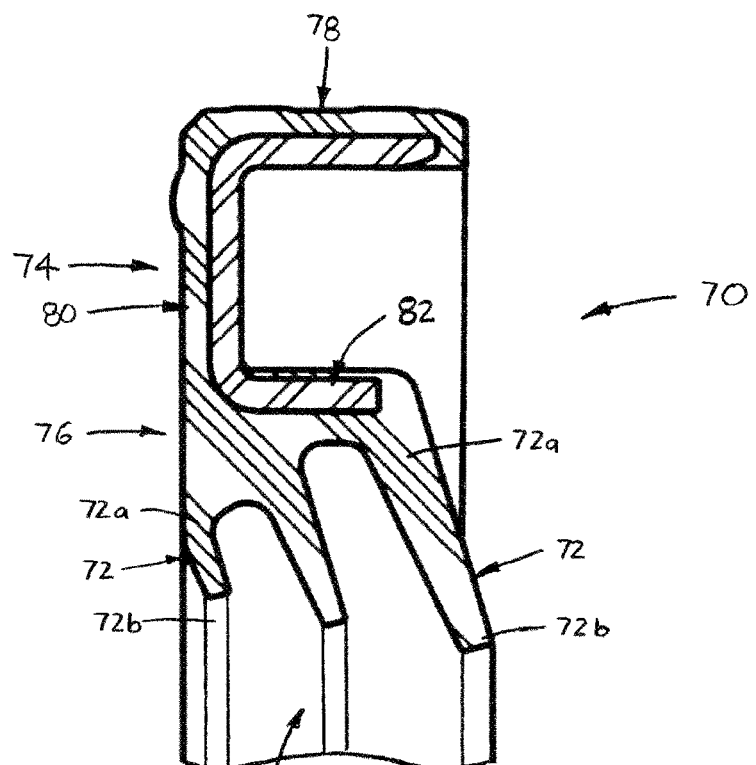
FIG. 15 is an enlarged, broken-away view of an upper portion of FIG. 13.

Referring to FIGS. 1, 2 and 7, as stated above, the seal assembly 10 preferably includes the tubular sleeve 18, which is disposed about the shaft 1 and includes the outer circumferential surface 19A and an opposing inner circumferential surface 19B. The inner surface 19B defines a central bore $B_S$ (FIG. 7) for receiving a portion of the shaft 1. With the preferred sleeve 18, the sealing lip(s) 15 of the flexible seal 14 sealingly engage the outer surface 19A and the sealing lip 17 on the inner radial end $16a$ of the rigid seal 16 is frictionally coupled with the sleeve 18. Further, the sleeve 18 preferably has at least one and most preferably a plurality of annular grooves 23 extending radially outwardly from the inner surface 19B and a corresponding number of annular sealing members 27, preferably O-rings, each disposed within a separate groove 23. As such, the sealing members 27 prevent fluid flow between the sleeve 18 and the shaft 1.

Referring now to FIGS. 1-3, 5, 8 and 10, the inner rigid seal 16 preferably includes a cylindrical portion 30 and a radial flange portion 32 and is preferably formed of a rigid polymeric material, most preferably polyether ether ketone ("PEEK"), but may be formed of another appropriate rigid polymeric material, a metallic material, etc. The cylindrical portion 30 is disposed at least partially about the sealing lip 15 of the flexible seal 14 and has a first axial end 30a disposed against the flexible seal 14, an opposing second axial end 30b and opposing inner and outer circumferential surfaces 31A, 31B. Preferably, an outwardly-extending annular shoulder 30c is formed adjacent to the first end 30a of the cylindrical portion 30 to increase the surface area in contact with the flexible seal 14. The radial flange portion 32 has an outer radial end 32a integrally formed with the second axial end 30b of the cylindrical portion 30 and opposing inner and outer radial surfaces 33A, 33B, respectively.

Further, the inner radial end 32b of the flange portion 32 is sized to be frictionally coupled with the shaft 1 or the sleeve 18 disposed about the shaft 1. That is, the radial flange portion 32 has a central opening ORI (FIG. 8) with an inside diameter $ID_R$ (FIG. 8) sized lesser than the outside diameter (not indicated) of the shaft 1 or the outside diameter $OD_S$ (FIG. 7) of the sleeve 18, such that the rigid seal 16 is coupled with the shaft 1, or preferably with the sleeve 18, with an interference fit. As such, the inner rigid seal 16 is generally static or non-rotational during rotation of the outer member 2, and thereby rotation also of the flexible seal 14, the outer rigid seal 28, etc., but enables a degree of sliding axial displacement along the shaft 1 or sleeve 18 when the flexible seal 14 is axially displaced (e.g., due to thermal expansion). Further, the radial flange portion 32 preferably has an inner angled section 35 extending generally toward the exterior side ES of the seal assembly 10 and providing the sealing lip 17, the angled section 35 being oriented such that fluid pressure on the rigid seal 16 biases the sealing lip 17 radially inwardly to facilitate sealing.

Referring to FIGS. 1-3, 5, 9 and 11, the outer annular rigid seal 28 is preferably formed of the same material as the inner rigid seal 16, most preferably PEEK material as discussed above. Preferably, the outer rigid seal 28 includes the cylindrical portion 34, an inwardly-extending radial flange portion 36 providing the sealing lip 40 and an outwardly-extending radial flange or shoulder 38. More specifically, the cylindrical portion 34 of the outer rigid seal 28 is preferably disposed at least partially about the cylindrical portion 30 of the inner rigid seal 16 and includes opposing first and second axial ends 34a, 34b, respectively, and opposing inner and outer circumferential surfaces 35A, 35B, respectively. Further, the cylindrical portion 34 of the outer rigid seal 28 is spaced radially outwardly from the cylindrical portion 30 of the inner rigid seal 16 so as to define the annular clearance space $S_C$ (FIGS. 3 and 5) between the inner rigid seal 16 and the outer rigid seal 28. The clearance space $S_C$ enables the outer rigid seal 28 to displace radially relative to the inner rigid seal 16 and vice-versa.

Furthermore, the radial flange portion 36 extends inwardly from the cylindrical portion 34 and is sealingly engaged with the radial flange portion 32 of the inner rigid seal 16. More specifically, the flange portion 36 has an outer radial end 36a integrally formed with the second axial end 34b of the cylindrical portion 34, an inner radial end 36b providing the lip 40, and opposing inner and outer radial surfaces 37A, 37B. The flange inner end 36b defines a central opening ORO (FIG. 9) sized substantially greater than the central opening ORI (FIG. 8) of the inner rigid seal 16, such that the inner radial end 36b is disposed against a central portion of the outer radial surface 33B of the inner rigid seal 16. Preferably, the radial flange portion 36 of the outer rigid seal 28 also has a tapered section 42 adjacent to the seal radial inner end 36b extending axially toward the inner seal 16 and providing the sealing lip 40.

Figure 3:
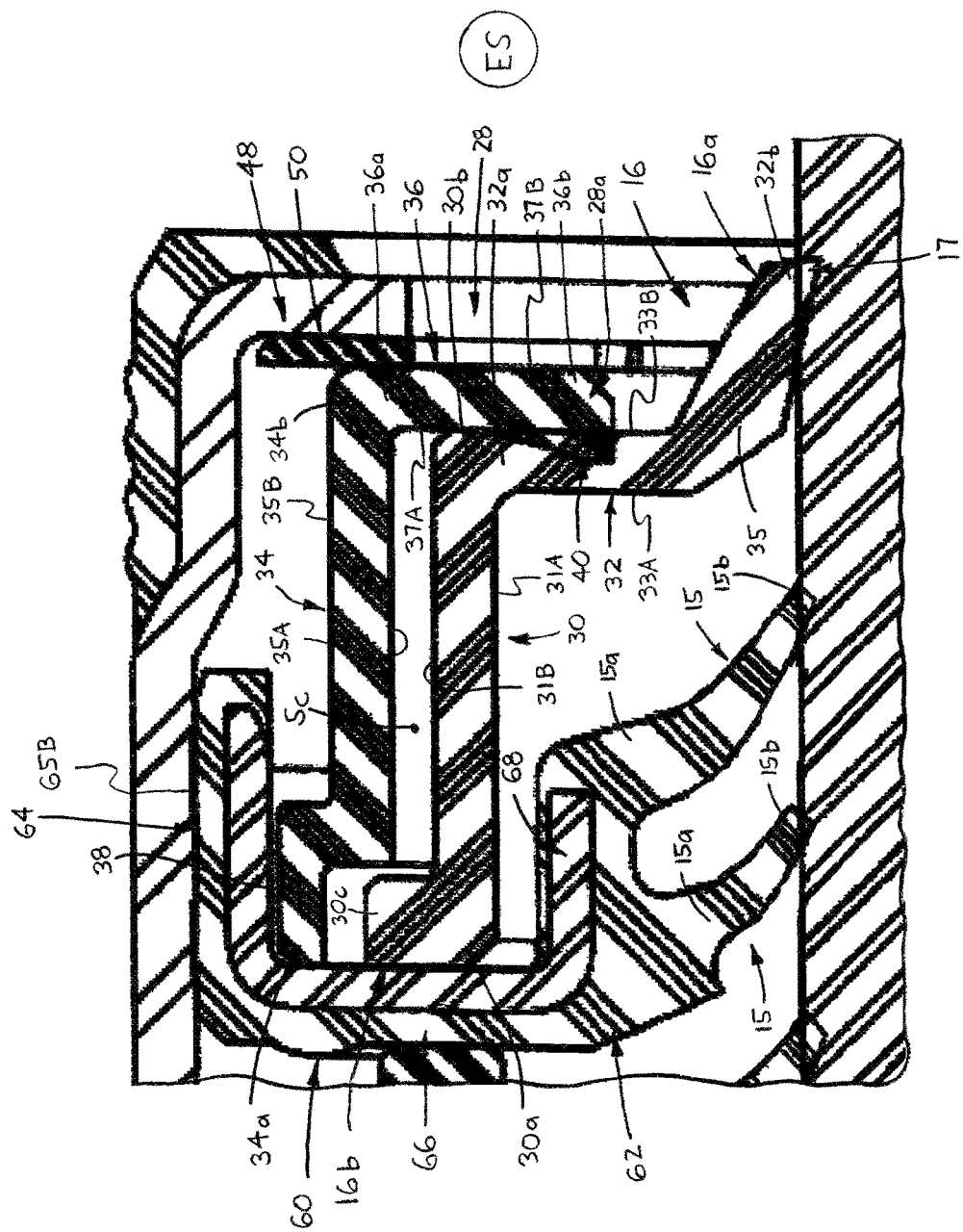
FIG. 3 is an enlarged, broken-away view of a portion of FIG. 1.

Referring to FIGS. 1-3, in certain constructions, the cylindrical portion 34 of the outer rigid seal 28 is sized such that the first axial end 34a of the outer rigid seal 28 is disposed against the flexible seal 14 and the annular biasing member 48 is disposed between the first radial flange 24 of the outer case 12 and the outer rigid seal 28. Preferably, the biasing member 48 is formed as a slotted disk spring 50 with a plurality of radially-inwardly extending fingers 52, as best shown in FIG. 2. The disk spring biasing member 50 is configured to bias the radial flange 36 of the outer rigid seal 28 against the radial flange 32 of the inner rigid seal 16, so as to maintain sealingly engagement between the rigid seals 16, 28, as well as to frictionally couple the outer rigid seal 28 with the case 12 and the flexible seal 14.

Figure 5:
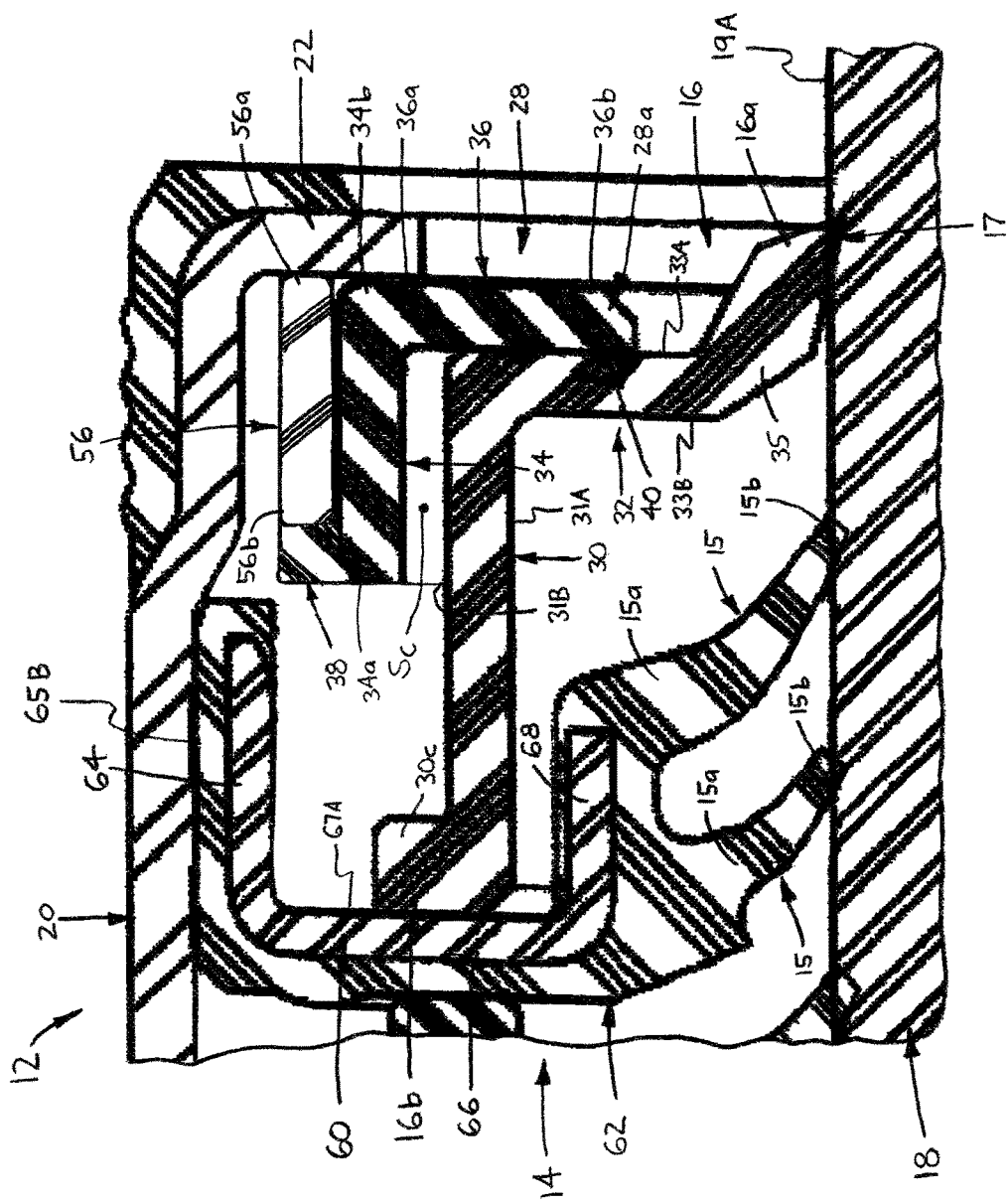
FIG. 5 is an enlarged, broken-away view of a portion of the seal assembly, shown with an alternative construction of an outer rigid seal.

Referring particularly to FIG. 5, in other constructions, the cylindrical portion 34 of the outer rigid seal 28 is spaced apart axially from the flexible seal 14 and the biasing member 48 preferably includes a tubular body 56 disposed about the cylindrical portion 34 of the outer rigid seal 28. The tubular body 56 has a first end 56a disposed against the outer case flange 22 and a second axial end 56b disposed against the outwardly-extending radial flange/shoulder 38 of the outer rigid seal 28. The tubular body biasing spring 56 is configured to bias the radial flange 36 of the outer rigid seal 28 against the radial flange 32 of the inner rigid seal 16, and couples the outer rigid seal 28 with the case 12. Preferably, the tubular biasing member 56 is formed as a solid tube of a compressible polymeric material, most preferably natural or synthetic rubber, but may be formed as coil spring or in any other appropriate manner that functions generally as described herein.

Referring to FIGS. 1-3, 5, 12, 14 and 16, the flexible seal 14 preferably includes a radially-outer case portion 60 coupled with the outer case 12 and a radially-inner elastomeric sealing portion 62 attached to the case portion 60 and providing the at least one and preferably at least two sealing lips 15. The seal case portion 60 is preferably formed of a combination of metallic and elastomeric materials, is generally C-shaped and includes an outer axial section 64, a central radial section 66 extending inwardly from the axial section 64, and an inner axial section 68. The outer axial section 64 has inner and outer circumferential surfaces 65A, 65B, the outer surface 65B being frictionally engaged with the inner circumferential surface 21B of the outer case 12 to couple the seal 14 with the case 12. The central section 66 has an outer radial end 66a integrally formed with the outer axial section 64, an inner radial end 66b integrally formed with the inner axial section 68, and first and second radial surfaces 67A, 67B, respectively. The outer radial end 16b of the rigid seal 16 is slidably disposed against the first radial contact surface 67A of the central radial section 66 of the seal case portion 60, such that the case surface 67A slides rotationally against the rigid seal end 16b during rotation of the outer member 2 and radially against the end 16b during radial displacement of the outer member 2 relative to the shaft 1 (e.g., due to eccentricity). Further, the inner axial section 68 extends axially from the inner end 66b of the radial section 66 so as to be generally parallel with the outer axial section 64.

The elastomeric sealing portion 62 is preferably molded to the case portion 60, most preferably with elastomeric section(s) of the case portion 60, and is arranged such that the one or more sealing lips 15 extend radially inwardly from the case portion inner axial section 68. More specifically, the two preferred lips 15 are spaced axially apart, are each generally annular and include a radially outer end 15a integral with the remainder of the elastomeric portion and a free, radially inner end 15b sealingly engageable with the shaft outer surface 1a, or preferably with the sleeve outer surface 19A. Further, each lip 15 is preferably generally angled toward the high-pressure exterior side ES of the seal assembly 10, and thus generally toward the rigid seal 16.

Referring now to FIGS. 1, 2, 4, 13, 15 and 16, the flexible seal 14 is preferably a first flexible seal 14 and the seal assembly 10 further comprises a second flexible seal 70 formed generally similarly to the first seal 14. The second flexible seal 70 is disposed within the outer case 12 and is spaced axially from the first flexible seal 14 such that the first seal 14 is disposed axially between the rigid seal 16 and the second flexible seal 70. As such, the second flexible seal 70 functions as a "back-up" to the first seal 14 to block the flow of any fluids (or solids) passing therethrough. The second flexible seal 70 has at least one and preferably three elastomeric sealing lips 72 engageable with the outer circumferential surface 1a of the shaft 1 or preferably with the outer surface 19A of the sleeve 18.

More specifically, the second flexible seal 70 preferably includes a C-shaped case portion 74 coupled with the outer case 12 and an elastomeric sealing portion 76 attached to the case portion 74 and providing the sealing lips 72. The seal case portion 74 includes an outer axial section 78 frictionally engaged with the outer case 12, a central radial section 80 extending inwardly from the axial section 78, and an inner axial section 82 extending from the radial section 80 and parallel to the outer axial section 78. The elastomeric sealing portion 76 is preferably molded to the case portion 74, most preferably integral with elastomeric portions of the case portion 74, and is arranged such that the sealing lips 72 extend radially inwardly from the case portion inner axial section 82. Further, the sealing lips 72 are spaced axially apart, are each generally annular and include a radially outer end 72a integral with the remainder of the elastomeric portion 76 and a free, radially inner end 72b sealingly engageable with the shaft outer surface 1a, or preferably with the sleeve outer surface 19A. As with the lips 15 of the first flexible seal 14, each lip 72 is preferably generally angled toward the high-pressure exterior side ES of the seal assembly 10, and thus generally toward the first flexible seal 14.

Still referring to FIGS. 1, 2, 4, 13, 15 and 16, with the two preferred flexible seals 14, 70, the seal assembly 10 preferably also comprises an annular spacer 84 formed of a rigid material, such as a rigid polymer or a metallic material, and disposed between the two flexible seals 14, 70. The spacer 84 has a first axial end 84a disposed against the first flexible seal 14 and an opposing, second axial end 84b disposed against the second flexible seal 70. Preferably, the spacer 84 is sandwiched between the central radial portions 66, 80 of the seal case portions 60, 74, respectively, and is configured to transfer axial loading between the first and second flexible seals 14, 70. Furthermore, the cavities 90 (FIG. 1) between the two flexible seals 14, 70, between the individual lips 15 or 72 of each seal 14, 70, respectively, and between the first flexible seal 14 and the inner rigid seal 16 are each preferably filled with a viscous lubricant, such as grease.

With the seal assembly 10 including the preferred second flexible seal 70 and the spacer 84, the second radial flange 24 of the case 12 is disposed against the second flexible seal 70, specifically against a radial surface 81 of the seal case portion central section 80. As such, the outer rigid seal 28, the first flexible seal 14, the annular spacer 84 and the second flexible seal 70 are axially retained between the first and second flanges 22, 24 of the outer case 12, and thereby coupled with the case 12 and the outer member 2. As a result, the entire seal assembly 10 is capable of withstanding relatively high axial loading and is axially displaceable relative to the shaft 1, either slidable directly against or against the sleeve outer surface 19A, as an entire unit, particularly due to thermal expansion.

The present seal assembly 10 has a number of advantages over previously known seal assemblies used in relatively harsh or extreme applications, such as a metal casting roll line as discussed above. The structure of the inner and outer rigid seals or "scrapers" 16, 28 permit both relative radial displacement to accommodate eccentricity between the outer member 2 and the shaft 1 as well as preventing separation between the seals 16, 28 during relative axial displacement. By forming the rigid seals 16, 28 of a rigid polymeric material such as PEEK, the seals 16, 28 provide a temperature resistant barrier against high temperature substances such as steam, heated water, metal scale particles, etc. Further, the flexible seals 14, 70 are protected by the rigid seals 16, 28 from materials which could damage the elastomeric materials of the lips 15, 17, while providing more efficient sealing due to the greater malleability and resilience of elastomeric material in comparison with more rigid polymeric materials, graphite, metallic materials, etc. Also, the multiple lips 15, 70 of the two flexible seals 14, 70 provide a substantial barrier to prevent any leakage of fluids to the interior side IS of the seal assembly 10. Furthermore, as discussed above, the axial "stacking" of the biasing member 48, the outer rigid seal 28, the first flexible seal 14, the spacer 84 and the second flexible seal 70 between the two case flanges 22, 24 provide an assembly 10 that is capable of moving axially as a unit (e.g., due to thermal expansion) and capable of absorbing high axial loading without damage to any these components or malfunctioning of the seal assembly 10.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A seal assembly for sealing between a central shaft and outer member disposed about the shaft, the outer member being rotatable about an axis extending through the shaft, the seal assembly comprising:

an outer annular case disposed within and coupled with the outer member so as to be angularly displaceable about the central axis;

an annular flexible seal disposed within and coupled with the case so as to angularly displace about the central axis when the outer member rotates about the axis, the flexible seal having at least one elastomeric sealing lip engageable with an outer circumferential surface of the shaft or of a sleeve disposed about the shaft;

an inner annular rigid seal disposed at least partially within the outer case and having an inner radial end, the inner radial end being spaced axially from the sealing lip and coupled with the shaft or with the sleeve, and an outer radial end slidably disposed against the flexible seal such that the flexible seal is radially displaceable relative to the rigid seal when the outer member displaces radially with respect to the shaft;

an outer annular rigid seal disposed about the inner rigid seal, coupled with the case so as to be angularly displaceable about the central axis and having an inner end sealingly engageable with the inner rigid seal; and a biasing member configured to bias the outer rigid seal toward the inner rigid seal such that the outer rigid seal sealingly engages with the inner rigid seal.

2. The seal assembly as recited in claim 1 wherein:
the outer case has an inwardly-extending radial flange;
the inner rigid seal includes a cylindrical portion having a first axial end disposed against the flexible seal and an opposing second axial end, and a radial flange integrally formed with the second axial end of the cylindrical portion and providing the inner end of the inner rigid seal;
the outer rigid seal includes a cylindrical portion having a first axial end disposed against the flexible seal and an opposing second axial end, and a radial flange integrally formed with the second axial end of the cylindrical portion and providing the inner end of the outer rigid seal; and
the biasing member is disposed between the radial flange of the case and the outer rigid seal and configured to bias the radial flange of the outer rigid seal against the radial flange of the inner rigid seal.

3. The seal assembly as recited in claim 2 wherein the biasing member is a slotted disk spring with a plurality of radially-extending fingers.

4. The seal assembly as recited in claim 1 wherein:
the outer case has an inwardly-extending radial flange;
the outer rigid seal includes a cylindrical portion having a first axial end disposed against the flexible seal and an opposing second axial end, and a radial flange integrally formed with the second axial end of the cylindrical portion and providing the inner end of the outer rigid seal; and
the biasing member includes a tubular body disposed about the cylindrical portion of the outer rigid seal and having a first end disposed against the outer case flange and a second axial end disposed against the outwardly-extending radial flange of the outer rigid seal, the biasing member being configured to bias the inwardly-extending radial flange of the outer rigid seal against the radial flange of the inner rigid seal.

5. The seal assembly as recited in claim 4 wherein the tubular body of the biasing member is formed of a compressible elastomeric material or a deflectable metallic material.

6. The seal assembly as recited in claim 1 wherein:
the inner rigid seal includes a cylindrical portion, the cylindrical portion being disposed at least partially about the sealing lip of the flexible seal and having a first axial end disposed against the flexible seal and an opposing second axial end, and a radial flange portion having an outer radial end integrally formed with the second axial end of the cylindrical portion and an inner radial end sized to be frictionally coupled with the shaft or the sleeve disposed about the shaft; and
the outer rigid seal includes a cylindrical portion disposed at least partially about the cylindrical portion of the inner rigid seal and a radial flange portion extending inwardly from the cylindrical portion and sealingly engaged with the radial flange of the inner rigid seal, the cylindrical portion of the outer rigid seal being spaced radially outwardly from the cylindrical portion of the inner rigid seal so as to define an annular clearance space between the inner rigid seal and the outer rigid seal.

7. The seal assembly as recited in claim 1 wherein the flexible seal includes a case portion coupled with the outer case and an elastomeric sealing portion attached to the case portion and providing the at least one sealing lip.

8. The seal assembly as recited in claim 7 wherein the case portion of the flexible seal is generally C-shaped and includes an outer axial section, the outer axial section having an outer circumferential surface frictionally engaged with the inner circumferential surface of the outer case to couple the seal with the case, a radial section extending inwardly from the axial section and providing a radial contact surface, and an inner axial section extending axially from an inner end of the radial section, the at least one sealing lip extending radially inwardly from the inner axial section.

9. The seal assembly as recited in claim 7 wherein the elastomeric sealing portion of the flexible seal includes at least two sealing lips spaced axially apart, each sealing lip being engageable with the shaft or the sleeve.

10. The seal assembly as recited in claim 1 wherein the flexible seal is a first flexible seal and the seal assembly further comprises a second flexible seal disposed within the case, spaced axially from the first flexible sealing member such that the first flexible seal is disposed axially between the inner rigid seal and the second flexible seal, and having at least one elastomeric sealing lip engageable with the outer circumferential surface of the shaft or of the sleeve.

11. The seal assembly as recited in claim 10 wherein
each one of the first and second flexible seals includes a case portion with a rigid radial section;
the seal assembly further comprises an annular spacer having a first axial end disposed against the rigid radial section of the first flexible seal and an opposing, second axial end disposed against the rigid radial section of the second flexible seal, the spacer being configured to transfer axial loading between the first and second flexible seals.

12. The seal assembly as recited in claim 11 wherein the outer case has a cylindrical portion with opposing first and second axial ends, a first radial flange extending inwardly from the cylindrical portion first axial end, the biasing member being disposed between the case first radial flange and the outer rigid seal, and a second radial flange extending inwardly from the cylindrical portion second axial end and disposed against the second flexible seal such that the outer rigid seal, the first flexible seal, the annular spacer and the second flexible seal are axially retained between the first and second flanges of the case.

13. The seal assembly as recited in claim 12 wherein the case includes at least one integral spacer portion extending axially from the case cylindrical portion and having an outer end contactable with a component spaced axially from the seal assembly.

14. The seal assembly as recited in claim 10 wherein each one of the first and second flexible seals includes at least two elastomeric sealing lips each engageable with the shaft or the sleeve.

15. The seal assembly as recited in claim 1 further comprising a tubular sleeve disposed about the shaft and having an outer circumferential surface, the at least one sealing lip of the flexible seal being engaged with the sleeve outer surface and the inner radial end of the rigid seal being frictionally coupled with the sleeve.

16. A seal assembly for sealing between a central shaft and outer member disposed about the shaft, the outer member being rotatable about an axis extending through the shaft, the seal assembly comprising:
    an outer annular case disposed within and coupled with the outer member so as to be angularly displaceable about the central axis, the case having a cylindrical portion with first and second axial ends, a first radial flange extending inwardly from the first axial end of the cylindrical portion and a second radial flange extending inwardly from the second axial end of the cylindrical portion;
    a first annular flexible seal disposed within and coupled with the case so as to angularly displace about the central axis when the outer member rotates about the axis, the flexible seal having at least one elastomeric sealing lip engageable with an outer circumferential surface of the shaft or of a sleeve disposed about the shaft;
    a second annular flexible seal disposed within and coupled with the case so as to angularly displace about the central axis when the outer member rotates about the axis, the second flexible seal being spaced axially from the first flexible seal and having at least one elastomeric sealing lip engageable with an outer circumferential surface of the shaft or of the sleeve disposed about the shaft;
    an inner annular rigid seal disposed at least partially within the outer case and having an inner radial end, the inner radial end being spaced axially from the sealing lip and coupled with the shaft or with the sleeve, and an outer radial end slidably disposed against the flexible seal such that the flexible seal is radially displaceable relative to the rigid seal when the outer member displaces radially with respect to the shaft;
    an outer annular rigid seal disposed about the inner rigid seal, coupled with the case so as to be angularly displaceable about the central axis and having an inner end sealingly engageable with the inner rigid seal; and
    a biasing member configured to bias the outer rigid seal toward the inner rigid seal such that the outer rigid seal sealingly engages with the inner rigid seal, the biasing member being disposed axially between the first radial flange of the outer case and the outer rigid seal or disposed about a cylindrical portion of the outer rigid seal.

17. The seal assembly as recited in claim 16 wherein:
    the inner rigid seal includes a cylindrical portion having a first axial end disposed against the flexible seal and an opposing second axial end, and a radial flange integrally formed with the second axial end of the cylindrical portion and providing the inner end of the inner rigid seal;
    the outer rigid seal includes a cylindrical portion having a first axial end disposed against the flexible seal and an opposing second axial end, and a radial flange integrally formed with the second axial end of the cylindrical portion and providing the inner end of the outer rigid seal; and
    the biasing member is disposed between the radial flange of the case and the outer rigid seal and configured to bias the radial flange of the outer rigid seal against the radial flange of the inner rigid seal.

18. The seal assembly as recited in claim 16 wherein:
    the outer rigid seal includes a cylindrical portion having a first axial end disposed against the flexible seal and an opposing second axial end, and a radial flange integrally formed with the second axial end of the cylindrical portion and providing the inner end of the outer rigid seal; and
    the biasing member includes a tubular body disposed about the cylindrical portion of the outer rigid seal and having a first end disposed against the outer case flange and a second axial end disposed against the outwardly-extending radial flange of the outer rigid seal, the biasing member being configured to bias the inwardly-extending radial flange of the outer rigid seal against the radial flange of the inner rigid seal.

19. The seal assembly as recited in claim 16 wherein each one of the first and second flexible seals includes a case portion coupled with the outer case and an elastomeric sealing portion attached to the case portion and providing the at least one sealing lip.

20. The seal assembly as recited in claim 16 wherein
    each one of the first and second flexible seals includes a case portion with a rigid radial section;
    the seal assembly further comprises an annular spacer having a first axial end disposed against the rigid radial section of the first flexible seal and an opposing, second axial end disposed against the rigid radial section of the second flexible seal, the spacer being configured to transfer axial loading between the first and second seals.

* * * * *